(12) United States Patent
Clark

(10) Patent No.: US 7,338,563 B2
(45) Date of Patent: Mar. 4, 2008

(54) PROCESS FOR CLEANING HYDROCARBONS FROM SOILS

(76) Inventor: Steve L. Clark, P.O. Box Z, Highlands, TX (US) 77562

( * ) Notice: Subject to any disclaimer, the term of this patent is extended or adjusted under 35 U.S.C. 154(b) by 721 days.

(21) Appl. No.: 10/741,389

(22) Filed: Dec. 19, 2003

(65) Prior Publication Data

US 2004/0134517 A1    Jul. 15, 2004

Related U.S. Application Data

(60) Division of application No. 09/507,060, filed on Feb. 21, 2000, now Pat. No. 6,688,318, which is a continuation-in-part of application No. 08/864,597, filed on May 28, 1997, now Pat. No. 6,137,026, which is a continuation-in-part of application No. 09/181,110, filed on Oct. 28, 1998, now Pat. No. 6,024,029, which is a division of application No. 08/730,974, filed on Oct. 16, 1996, now Pat. No. 5,906,806.

(51) Int. Cl.
  *B08B 3/08* (2006.01)
  *B08B 3/14* (2006.01)

(52) U.S. Cl. .......................... 134/10; 134/25.1; 134/34

(58) Field of Classification Search .................. 134/10, 134/13, 26, 27, 30, 34, 35, 36, 37, 25.1
See application file for complete search history.

(56) References Cited

U.S. PATENT DOCUMENTS

| | | | |
|---|---|---|---|
| 1,805,751 A * | 5/1931 | Auerbach | .................... 208/321 |
| 2,102,427 A | 12/1937 | Lloyd et al. | |
| 2,143,283 A | 1/1939 | Schmidt | |
| 3,001,373 A | 9/1961 | Du Bois Eastman et al. | |
| 3,291,304 A * | 12/1966 | Fuchs | .......................... 134/33 |
| 3,403,643 A | 10/1968 | Denig | |
| 3,628,332 A | 12/1971 | Kennar | |
| 3,779,212 A | 12/1973 | Wagner | |
| 3,861,330 A | 1/1975 | Santoleri | |
| 3,861,332 A | 1/1975 | Itasaka | |
| 3,861,334 A | 1/1975 | Stockman | |
| 3,905,745 A | 9/1975 | Konda | |
| 4,344,486 A | 8/1982 | Parrish | |

(Continued)

FOREIGN PATENT DOCUMENTS

EP    0 503 910 A1    9/1992    .................. 62/929

(Continued)

*Primary Examiner*—M. Safavi
(74) *Attorney, Agent, or Firm*—Douglas W. Rommelmann; Andrews Kurth LLP

(57) ABSTRACT

A combination of parallel processes is disclosed to provide optimal re-mediation operations for contaminated soil. Soils with high levels of heavy petroleum hydrocarbons are directed to a thermal process for destruction in a combustion process. Carbon dioxide generated and recovered in the thermal process is employed as a solvent in a solvent process to clean other soils of petroleum hydrocarbons and certain chlorinated hydrocarbon compounds. In the solvent process, contaminated soils are run through a closed soil separator where the soils are washed with carbon dioxide. The carbon dioxide is then dried from the soil and the soil is sent for segregation. Soils with the lightest forms of hydrocarbon contamination (gasoline, etc.) are subjected to a vaporization process utilizing heat energy generated in the thermal process to heat the soil, under a partial vacuum, and the vapors generated are captured, condensed, and recovered as product.

20 Claims, 13 Drawing Sheets

U.S. PATENT DOCUMENTS

| | | | |
|---|---|---|---|
| 4,434,028 A * | 2/1984 | Eppig et al. | 196/14.52 |
| 4,437,419 A | 3/1984 | Hertel | |
| 4,520,741 A | 6/1985 | Carbeau et al. | |
| 4,542,114 A | 9/1985 | Hegarty | |
| 4,608,126 A | 8/1986 | Watson et al. | |
| 4,620,492 A | 11/1986 | Vogg et al. | |
| 4,656,972 A | 4/1987 | Shimoda | |
| 4,667,609 A * | 5/1987 | Hardison et al. | 588/320 |
| 4,762,074 A | 8/1988 | Sorensen | |
| 4,782,625 A | 11/1988 | Gerken et al. | |
| 4,782,772 A | 11/1988 | Chughtai et al. | |
| 4,827,854 A | 5/1989 | Collette | |
| 4,829,911 A | 5/1989 | Nielson | |
| 4,860,670 A | 8/1989 | Jorgensen | |
| 4,922,841 A | 5/1990 | Kent | |
| 5,016,599 A | 5/1991 | Jubb | |
| 5,035,188 A | 7/1991 | Johnson et al. | |
| 5,050,508 A | 9/1991 | Wilson | |
| 5,117,771 A | 6/1992 | Summers | |
| 5,129,331 A | 7/1992 | Merritt et al. | |
| 5,161,326 A | 11/1992 | Weirich et al. | |
| 5,179,903 A | 1/1993 | Abboud et al. | |
| 5,188,041 A * | 2/1993 | Noland et al. | 134/19 |
| 5,222,446 A | 6/1993 | Edwards et al. | |
| 5,309,850 A | 5/1994 | Downs et al. | |
| 5,339,755 A | 8/1994 | Smith | |
| 5,344,627 A | 9/1994 | Fujii et al. | |
| 5,402,739 A | 4/1995 | Abboud et al. | 110/346 |
| 5,403,569 A | 4/1995 | Abdelmalek | |
| 5,450,801 A | 9/1995 | Abboud | |
| 5,452,763 A | 9/1995 | Owen | |
| 5,456,759 A * | 10/1995 | Stanford et al. | 134/10 |
| 5,467,722 A | 11/1995 | Meratla | |
| 5,500,194 A | 3/1996 | Bell | |
| 5,518,621 A | 5/1996 | Holcombe et al. | |
| 5,611,837 A * | 3/1997 | Bossert et al. | 134/7 |
| 5,645,730 A | 7/1997 | Malachosky et al. | |
| 5,648,053 A | 7/1997 | Mimura et al. | 423/220 X |
| 5,662,050 A | 9/1997 | Angelo, II et al. | |
| 5,665,319 A | 9/1997 | Hirama et al. | |
| 5,709,077 A | 1/1998 | Beichel | |
| 5,711,770 A | 1/1998 | Malina | |
| 5,724,805 A | 3/1998 | Golomb et al. | |
| 5,732,571 A | 3/1998 | Maerz et al. | 62/611 |
| 5,759,209 A * | 6/1998 | Adler et al. | 134/34 |
| 5,833,756 A * | 11/1998 | Haegel et al. | 134/10 |
| 5,906,806 A | 5/1999 | Clark | 423/437.1 |
| 6,224,774 B1 * | 5/2001 | DeSimone et al. | 134/10 |
| 6,319,328 B1 * | 11/2001 | Greenberg et al. | 134/10 |
| 6,763,840 B2 * | 7/2004 | DeSimone et al. | 134/109 |
| 7,175,716 B2 * | 2/2007 | Tunnicliffe et al. | 134/11 |

FOREIGN PATENT DOCUMENTS

| | | | |
|---|---|---|---|
| JP | 5 126324 | 5/1993 | 110/345 |

* cited by examiner

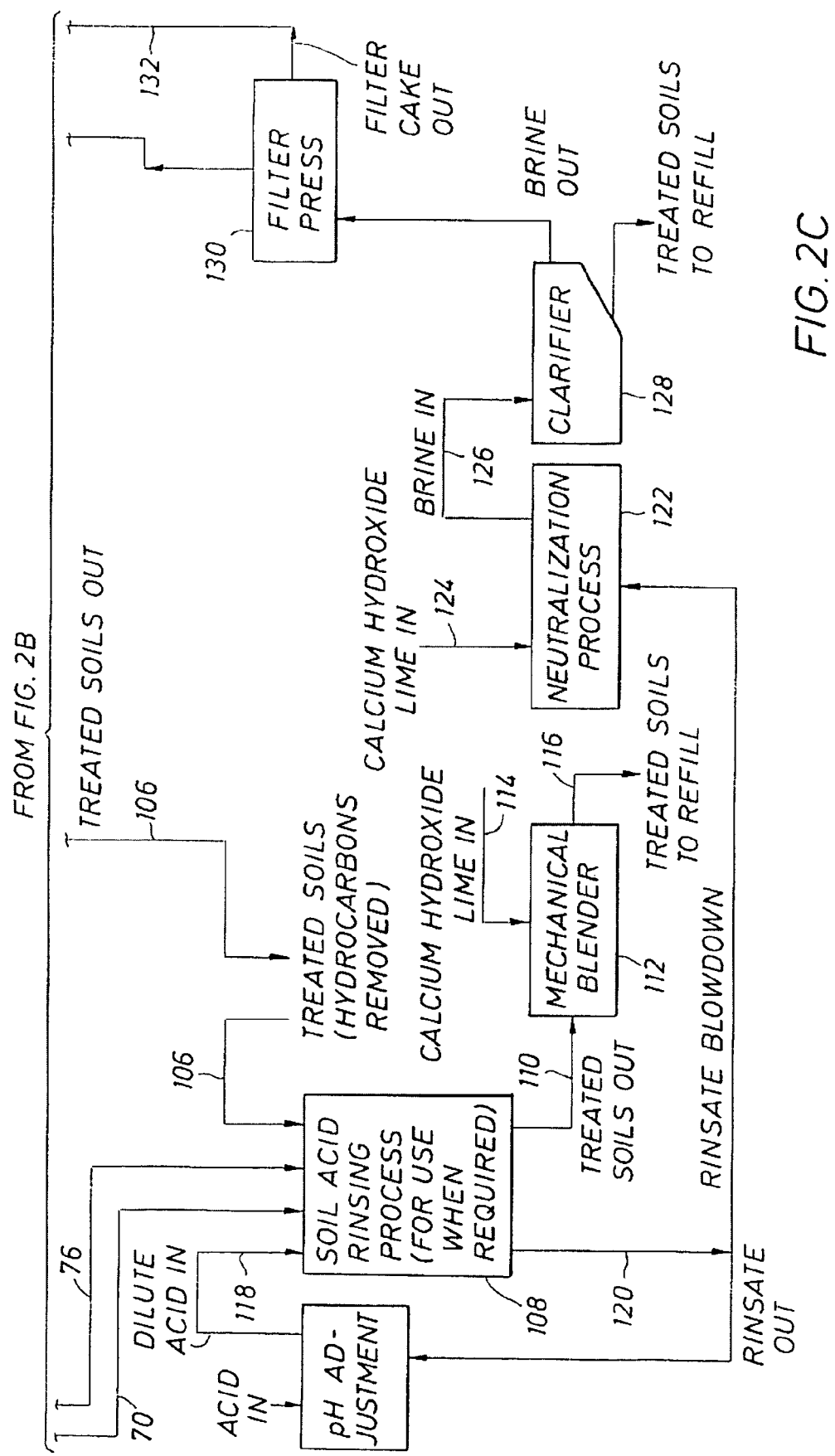

US 7,338,563 B2

PROCESS FOR CLEANING HYDROCARBONS FROM SOILS

CROSS-REFERENCE TO RELATED APPLICATIONS

This application is a divisional application of application Ser. No. 09/507,060, filed Feb. 21, 2000 now U.S. Pat. No. 6,688,318 (Notice of Allowance mailed Sep. 23, 2003), which is a continuation-in-part of application Ser. No. 08/864,597, filed May 28, 1997, which issued as U.S. Pat. No. 6,137,026; and which is a continuation-in-part of application Ser. No. 09/181,110, filed Oct. 28, 1998, which issued as U.S. Pat. No. 6,024,029, and which was a divisional of application Ser. No. 08/730,974, filed Oct. 16, 1996, and which issued as U.S. Pat. No. 5,906,806. Each of these applications is hereby incorporated by reference herein, in their entirety, for all purposes.

BACKGROUND OF THE INVENTION

1. Field of the Invention

The present invention relates to a process for decontaminating soil and waste materials. More particularly, the present invention relates to a combination of processes including a thermal combustion process, a solvent wash process that utilizes carbon dioxide generated in the thermal process, and a vaporization process that utilizes heat energy generated in the thermal process, which in combination are used to remove volatile organic compounds from soil and other waste which have various levels of contamination.

2. Description of the Related Art

For many years a major problem occurring with the development of industry, in general, and the energy and petrochemical industry, in particular, has been the need to remove the oils and other hydrocarbons that have been spilled from contaminated soil. The processes of choice have always been traditional thermal combustion processes, but the cost of these processes and the collateral damage that they can cause to the environment makes this solution unattractive in many cases. Most soil contamination is reported to be less than one percent (1%) by volume. The thermal processing of this material which contains very little hydrocarbon contamination is expensive at the very least, and most frequently causes damage to the soil. Further, the effects of the airborne contaminates and the use of ambient air in the thermal process can result in damage to a wide area.

Other treatment processes for contaminated soils lack the ability to clean or remediate the contamination. Burying soils in vaults has not been a viable or cost effective solution and the excavation and transportation of contaminated soil leaves the high possibility of scattering the pollution. The use of microorganisms or "microbes" has little value since much of the contamination either kills the organisms or they have little effect on the pollutant. Additionally, few people desire or will accept a sludge pit in their neighborhood.

It has been known to use carbon dioxide as a liquid near its critical state or as a fluid in its super-critical state to serve as an extractant for hydrocarbons from various materials. See, for example, U.S. Pat. No. 4,434,028. However, concern is now being raised over the environmental pollution resulting from emission of carbon dioxide. Carbon dioxide has been identified as one of many "greenhouse" gases and its increased level in the earth's atmosphere is thought likely to contribute to an undesirable global warming effect.

It would be desirable to have a process that addresses and resolves most if not all of these concerns and interacts proactively to provide an acceptable, non-polluting, cost effective solution to this major social and environmental problem.

BRIEF SUMMARY OF THE INVENTION

The present invention is a combination of parallel processes that provide optimal remediation operations for contaminated soil. Soils with high levels of heavy petroleum hydrocarbons are directed to a thermal process for destruction in a combustion process. Carbon dioxide generated and recovered in the thermal process is employed as a solvent in a solvent process to clean soils having moderate contamination with petroleum hydrocarbons and chlorinated hydrocarbon compounds. In this solvent process, contaminated soils are run through a closed soil separator where the soils are washed with carbon dioxide. The carbon dioxide is then dried from the soil and the soil is sent for segregation. Additionally, soils with the lightest forms of hydrocarbon contamination, such as gasoline, etc., are subjected to a vaporization process utilizing heat energy generated from the thermal process to heat the soil under a partial vacuum. The vapors generated are captured, condensed, and recovered as product.

BRIEF DESCRIPTION OF THE SEVERAL VIEWS OF THE DRAWINGS

A better understanding of the present invention can be obtained when the detailed description set forth below is reviewed in conjunction with the accompanying drawings, in which.

DETAILED DESCRIPTION OF THE INVENTION

Figure 1:
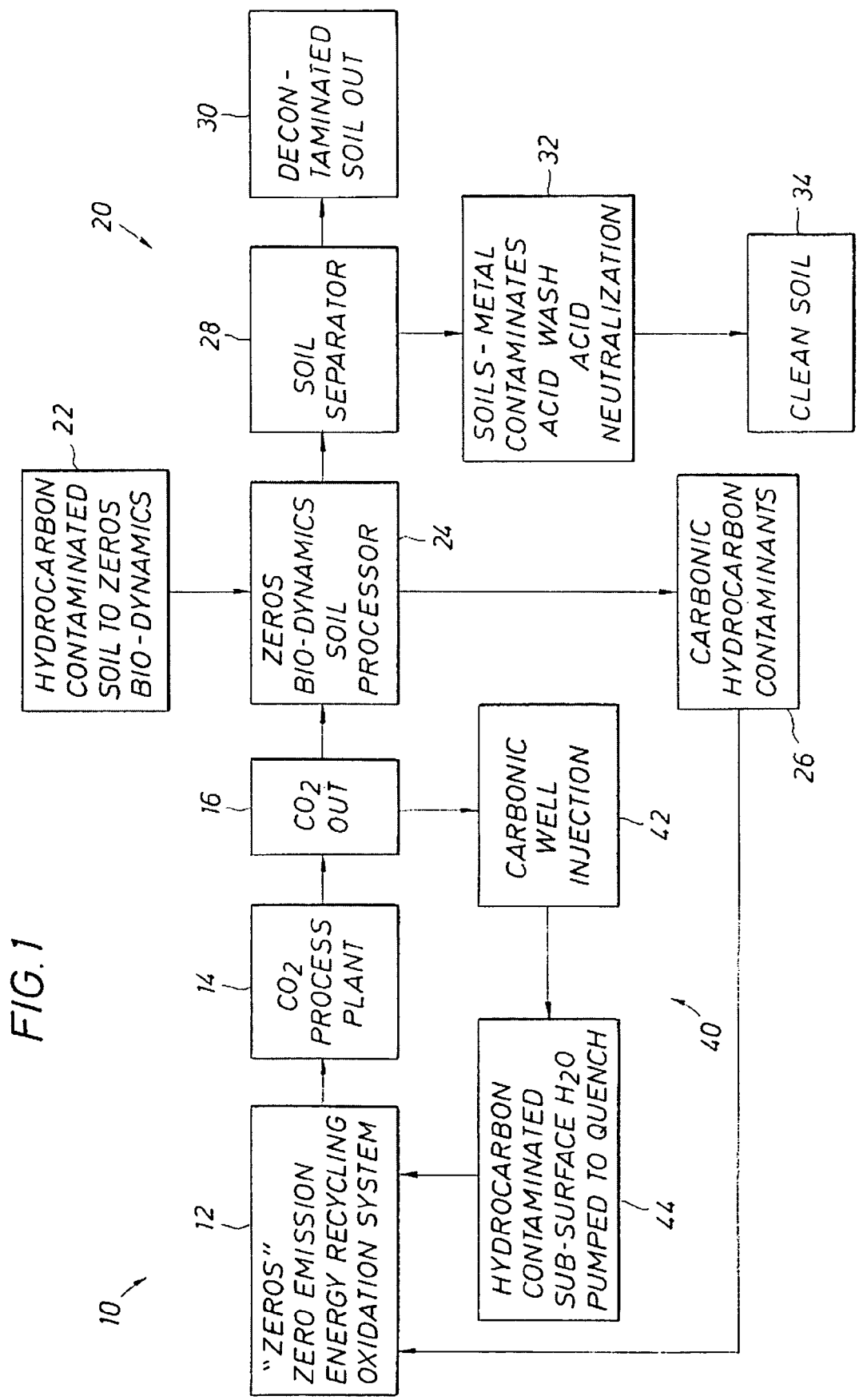
FIG. 1 is a block flow diagram of an embodiment of the combined thermal, solvent, and vaporization processes.

As shown in FIG. 1, the process of the present invention combines a thermal process 10 that includes a combustion step 12 with carbon dioxide recovery 14, with a solvent process 20 for removing hydrocarbons from contaminated soils utilizing carbon dioxide from the thermal process 10 as a solvent. The thermal process 10 includes a combustion step 12 that utilizes oxygen rather than air for oxidation and which utilizes a recycle to increase the combustion efficiency. The carbon dioxide generated in the combustion step is recovered in a carbon dioxide processing step 14. The recovered carbon dioxide is then forwarded in a carbon dioxide distribution step 16 to the solvent process 20. Thermal process 10 is referred to in the figures generally as the ZEROS process. Solvent process 20 is referred to in the figures generally as Biodynamics.

The solvent process 20 begins with a step 22 of introducing contaminated soil or other waste material and carbon dioxide from the distribution step 16 into a soil processor. Soil processing step 24 uses carbon dioxide as a solvent to extract hydrocarbons and other contaminants such as chlorinated compounds. The carbon dioxide containing the extracted hydrocarbon and other contaminants is separated from the soil. The contaminated carbon dioxide can then be returned to the thermal process 10 for combustion of the hydrocarbons and recovery of the carbon dioxide.

After separation of the carbon dioxide, the soil is then subjected to a segregation step 28 in which soils containing metal contaminants are separated for further treatment. The remaining decontaminated soils are removed from the solvent process 20 in a removal step 30 for return to the original site of removal or to other locations for use as refill. Soil contaminated with metals can be treated in an acid wash and neutralization process 32 to remove the metals. The treated soil is then removed from the system in a removal step 34 for return to the original site or to other locations for use as refill.

An alternative process 40 that can also be used in conjunction with the thermal process involves cleaning contaminated soil in place. Carbon dioxide from the distribution step 16 is injected into the ground through a monitoring well in an injection step 42. The carbon dioxide acts as a solvent, picking up hydrocarbons, as it migrates through the earth and accumulating hydrocarbons in subsurface water. The hydrocarbon contaminated subsurface water and the carbon dioxide can then be pumped to the surface in a recovery step 44. The contaminated water and carbon dioxide can be treated in thermal process 10 to combust the hydrocarbons and recover the decontaminated water and carbon dioxide.

Figure 2A:
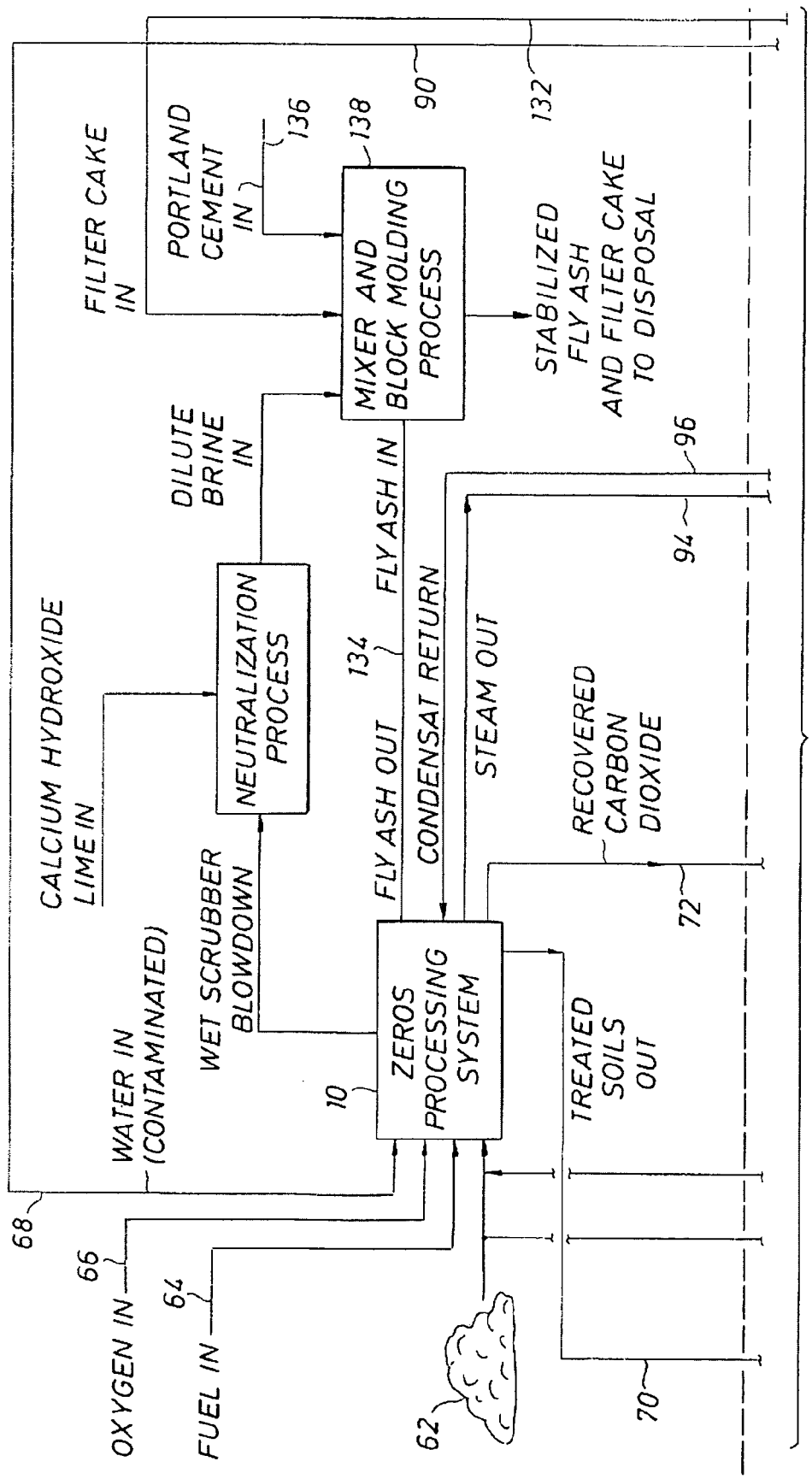
FIGS. 2A, B, and C are a detailed flow diagram of an embodiment of the combined thermal, solvent, and vaporization processes.
Figure 2B:
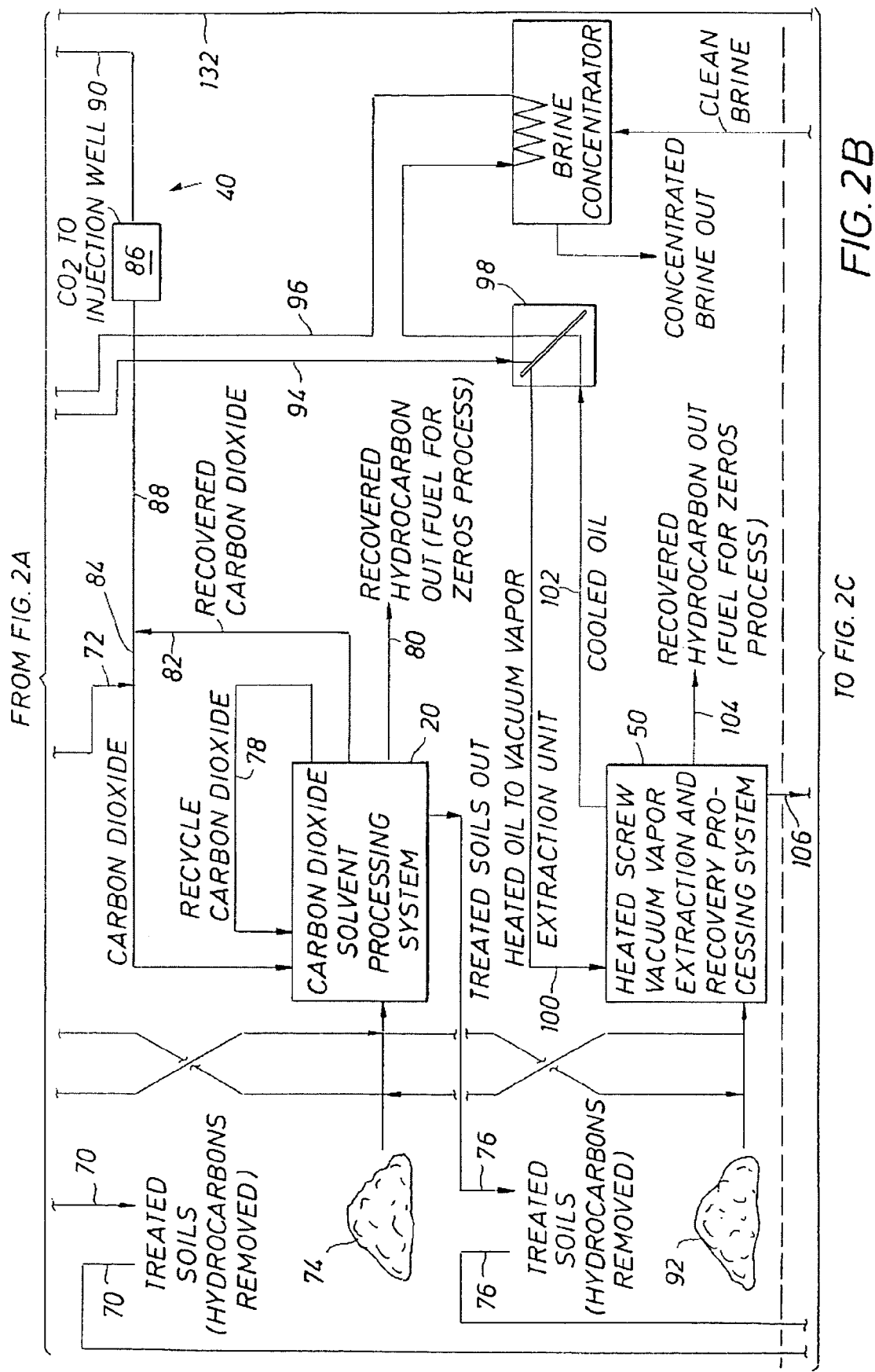

FIG. 2 depicts a more detailed flow sheet of the thermal process 10, the solvent process 20, and the vaporization process 50 of the present invention and the interaction between the processes when combined. This combination allows for the treatment of all types or levels of contamination and the general remediation of a contaminated area without any air or water pollution. The present invention allows for the complete destruction of contamination while producing an environmentally benign byproduct that aids and accelerates the remediation process.

Thermal Process

Thermal process 10 of the present invention utilizes pure oxygen for combustion, but additionally utilizes a combination of water injection and combustion gas re-circulation to moderate and control the combustion gas temperature achieved in the combustion chamber. The utilization of oxygen for combustion, and water injection and re-circulated combustion gas for moderating combustion gas temperature, avoids the introduction of nitrogen into the combustion process. Nitrogen in a combustion process leads to the formation of pollution in the form of oxides of nitrogen (NOx). Since air is composed of roughly 80% nitrogen by volume, the present invention by design avoids the employment of air as the source of oxygen for combustion or as a means of moderating the combustion gas temperature in the combustion chambers. Other reasons for avoiding the use of air in the present invention are the fact that a high volume of combustion gas would be produced per unit of fuel combusted and the resulting combustion gas would contain a lower percentage of carbon dioxide making carbon dioxide recovery less efficient.

Thermal process 10 begins by introducing soil 62, heavily contaminated by hydrocarbons, a fuel stream 64 or other hydrocarbon containing stream, an oxygen stream 66, and a water stream 68 into a combustion process. The thermal process 10 uses oxygen for combustion, combined with re-circulation of combustion gas and water injection to moderate combustion gas temperature, to avoid the necessity for introduction of nitrogen into the system. This allows for a more efficient combustion process generating greater combustion to carbon dioxide and decreasing the amount of emissions generated by the thermal process 10. A decontaminated soil stream 70 is removed from the thermal process 10 for replacement or refill. The thermal process of the present invention is disclosed in U.S. Pat. No. 5,906,806 and Applicant's co-pending application Ser. Nos. 08/730,974 and 09/234,036, each of which are hereby incorporated by reference in their entirety for all purposes.

Figure 3:
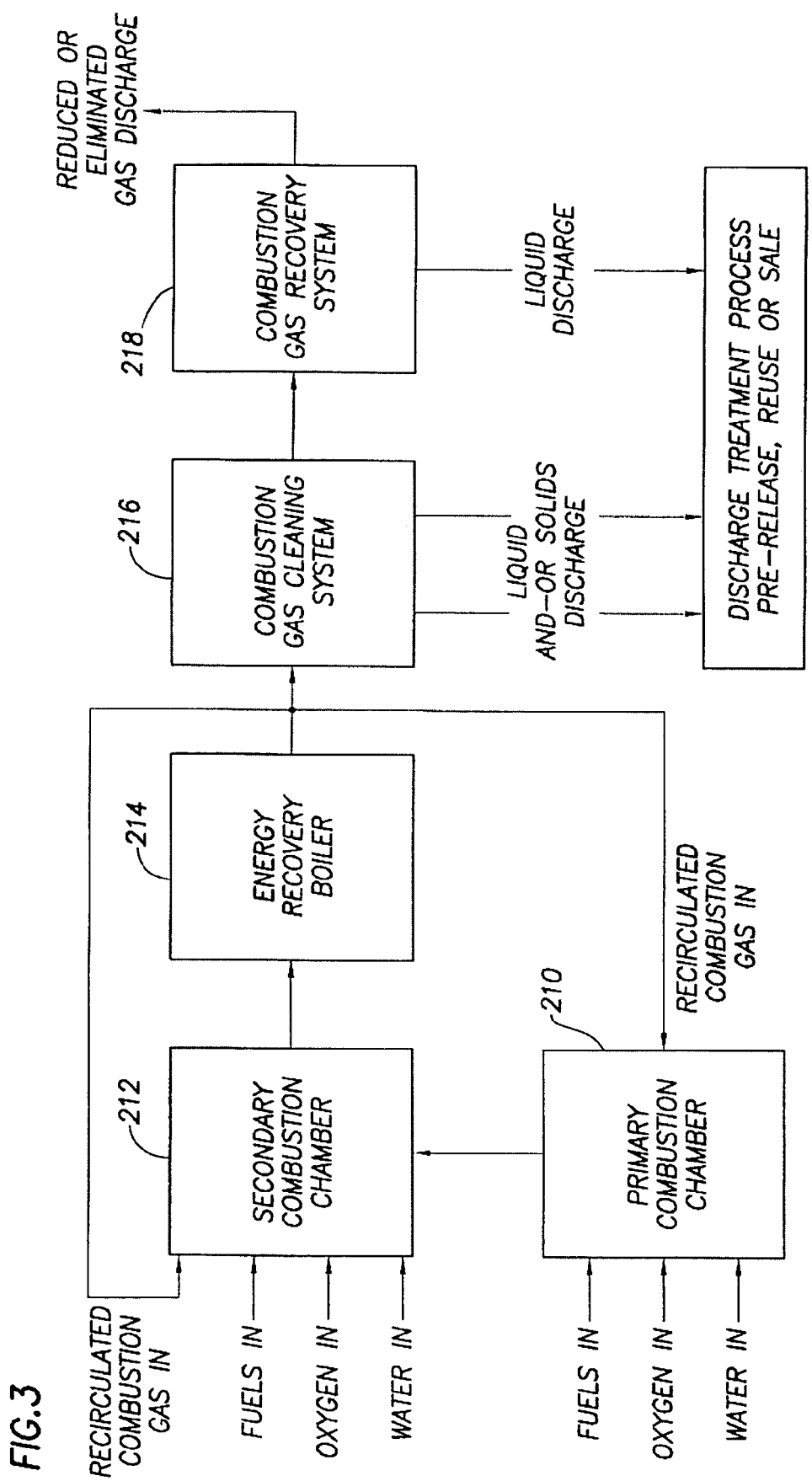
FIG. 3 is a block flow diagram of an embodiment of the thermal process.

As shown in FIG. 3, a fuel stream is injected into primary combustion chamber 210 along with a substantially pure oxygen stream and a water stream. The fuel stream can be a combination of a clean hydrocarbon stream such as natural gas, methane, etc. and a waste stream such as liquid or soil wastes containing hydrocarbon. The fuel, oxygen, and water streams are combusted in primary combustion chamber 210 and the combustion product is then transferred to secondary combustion chamber 212. In secondary combustion chamber 212, the combustion product is further combusted along with additional fuel, oxygen, and water streams to produce a final reaction product stream. The reaction product stream is then introduced to an energy recovery boiler 214 or other means of removing and recovering heat energy from the reaction product stream. The cooled reaction product stream is then split with a portion of the cooled reaction product stream being recirculated to primary combustion chamber 210, a portion being recirculated to secondary combustion chamber 212, and a portion proceeding forward to combustion gas cleaning system 216. In combustion gas cleaning system 216, the cooled reaction product stream is treated to remove acidic components, residual organic components, and finally to separate the water contained in the reaction product stream from the carbon dioxide. Carbon dioxide is then introduced into combustion gas recovery system 218 where it is purified and liquefied to produce a liquid carbon dioxide product. As will be recognized by those skilled in the art, implementation of these components of the present invention will reduce or eliminate the gas discharge to the atmosphere.

Ideal complete combustion of a pure hydrogen fuel with pure oxygen yields carbon dioxide and water as the products of combustion. To insure high combustion efficiency, an excess of oxygen is required along with high temperature, high combustion gas turbulence, and long combustion gas residence time in the chamber(s) supporting the combustion process. These factors all contribute to contact opportunity between oxygen molecules and molecules of hydrogen fuel(s) by producing robust mixing of the gases for long periods of time. The high temperature additionally provides the drive or ignition energy to produce the chemical reaction between the oxygen and fuel(s) when contact between molecules occurs.

Wagner teaches in U.S. Pat. No. 3,779,212 that a pure hydrogen fuel oxidized with pure oxygen produces carbon dioxide, water, and carbonic acid as products of combustion. Wagner further teaches that the carbonic acid rapidly disassociates into carbon dioxide and water resulting in only carbon dioxide and water as the ultimate products of the process. Wagner additionally teaches that the flame temperature associated with the combustion of pure methane with pure oxygen can reach 6,000 degrees Fahrenheit, (3,315.56 degrees Celsius). Wagner's invention is a specialized boiler designed to maximize thermal efficiency with very small size and low weight per unit of energy derived. For refractory lined combustion chambers and standard energy recovery boiler systems, lower combustion gas temperatures are required. Typical refractory limitations on continuous operating temperature are in the area of 2,500 degrees Fahrenheit (1371.1 degrees Celsius). The present invention utilizes pure oxygen for combustion, but additionally utilizes a combination of water injection and combustion gas recirculation to moderate and control the combustion gas temperature achieved in the combustion chambers.

The utilization of oxygen for combustion and water injection and recirculated combustion gas to moderate combustion gas temperature avoid the introduction of nitrogen into the combustion process. As taught by Wagner, nitrogen in a combustion process leads to the formation of pollution in the form of oxides of nitrogen (NOx). Since air is composed of roughly 80% nitrogen by volume, the present invention by design avoids the employment of air as the source of oxygen for combustion or as a means for moderating the combustion gas temperature in the combustion chambers. Other reasons for avoiding use of air in the present invention are the fact that a high volume of combustion gas would be produced per unit of fuel combusted and the resulting combustion gas would contain a lower percentage of carbon dioxide making carbon dioxide recovery less efficient.

The following formulation and calculations detail the relationship discussed above:

combustion of methane with pure oxygen $$CH4+2O2=>CO2+2H2O$$

For each mole weight of methane two mole weights of oxygen are required for stoichiometric combustion. One mole weight of methane equals 16 atomic weight units while two mole weights of oxygen equals 64 atomic weight units. Each kilogram of pure methane then requires four kilograms of pure oxygen for stoichiometric combustion resulting in 5 kilograms of combustion gas consisting of one mole weight of carbon dioxide and two mole weights of water. Carbon dioxide has a mole weight of 44 atomic weight units while water has a mole weight of 18 atomic weight units. The stoichiometric combustion of one kilogram of pure methane with pure oxygen then product (5×(44/80))=2.75 kilograms of carbon dioxide and (5×((2×18)/80)))=2.25 kilograms of water.

Typically, an excess amount of oxygen is supplied to a combustion process to provide greater opportunity for complete combustion of fuels than is afforded by a one to one stoichiometric ratio of oxygen to fuel. Depending on the fuel being combusted and the combustion process efficiency the typical amount of excess oxygen supplied is in the range of 5% to 10%. For this discussion and for ease of calculation consider a 5% excess of oxygen for a practical combustion process. In such case each kilogram of pure methane would then require 4.2 kilograms of pure oxygen for combustion resulting in the production of 5.2 kilograms of combustion gas of which 0.2 kilograms is residual oxygen. By weight percentage the combustion gas composition from this process would then be as follows:

| | |
|---|---|
| Carbon Dioxide: | (2.75/5.2) × 100 = 52.88462% |
| Water: | (2.25/5.2) × 100 = 43.26923% |
| Oxygen: | (0.2/5.2) × 100 = 3.84615% |

Using the known heating value of methane, calculated approximate specific heat capacities for the combustion gas constituents, an approximate ambient temperature and an approximate resultant combustion gas temperature can be calculated. The following relationship applies:

$$T_{GAS}=T_{AMB}+((Q_{REL}-Q_{LOSS})/C_P)/M_{GAS})$$

Where $T_{GAS}$=Resultant Combustion Gas Temperature
$T_{AMB}$=Ambient Temperature
$Q_{REL}$=Thermal Energy Release Rate
$Q_{LOSS}$=Thermal Energy Loss Rate
$C_P$=Combustion Gas Specific Heat Capacity
$M_{GAS}$=Combustion Gas Mass Flow Rate The published heat of combustion of methane is 21,520 BTU/LB (11,955.55 Kilo Cal/Kilogram). This value takes into account the latent heat of vaporization of the water produced in the combustion reaction and is applicable for the above equation.

The heat capacity of a given gas varies with temperature and pressure. Working with a constant pressure the specific heat capacity with variation due only to temperature can be derived, CP. For this analysis a constant pressure of one atmosphere may be assumed. Data are available for the gases of interest here at one atmosphere of pressure over the range of temperature to be encountered in a combustion process. CP for these gases may be expressed as a polynomial function of the form, $CP=a0+a1T+a2T2+a3T3=\ldots anTn$ where T is the absolute temperature of the gas of interest. In the temperature range of 0 to 2,500° F. the following fourth order polynomials with 99.0% confidence level have been derived for the atmosphere constant pressure specific heat capacities of the noted gases:

| | |
|---|---|
| Carbon Dioxide: | $C_{P(CO2)} = 0.155989405 + 0.000194244567\ (T) - 5.69601423 \times 10^{-8}\ (T^2) + 2.64619520 \times 10^{-13}\ (T^3) + 4.73867961 \times 10^{-17}\ (T^4)$ KCal/Kg-° K |
| Oxygen: | $C_{P(O2)} = 0.194741234 + 9.17986378 \times 10^{-5}\ (T) - 3.60408938 \times 10^{-8}\ (T^2) + 1.03017213 \times 10^{-11}\ (T^3) - 3.13211436 \times 10^{-15}\ (T^4)$ KCal/Kg-° K |
| Water Vapor: | $C_{P(H2O)} = 0.378246954 + 0.0002190970339\ (T) - 7.65417026 \times 10^{-8}\ (T^2) + 4.54506122 \times 10^{-11}\ (T^3) - 1.22059215 \times 10^{-14}\ (T^4)$ KCal/Kg-° K |

Where T is temperature in degrees Kelvin.

Where T is temperature in degrees Kelvin.

Figure 4:
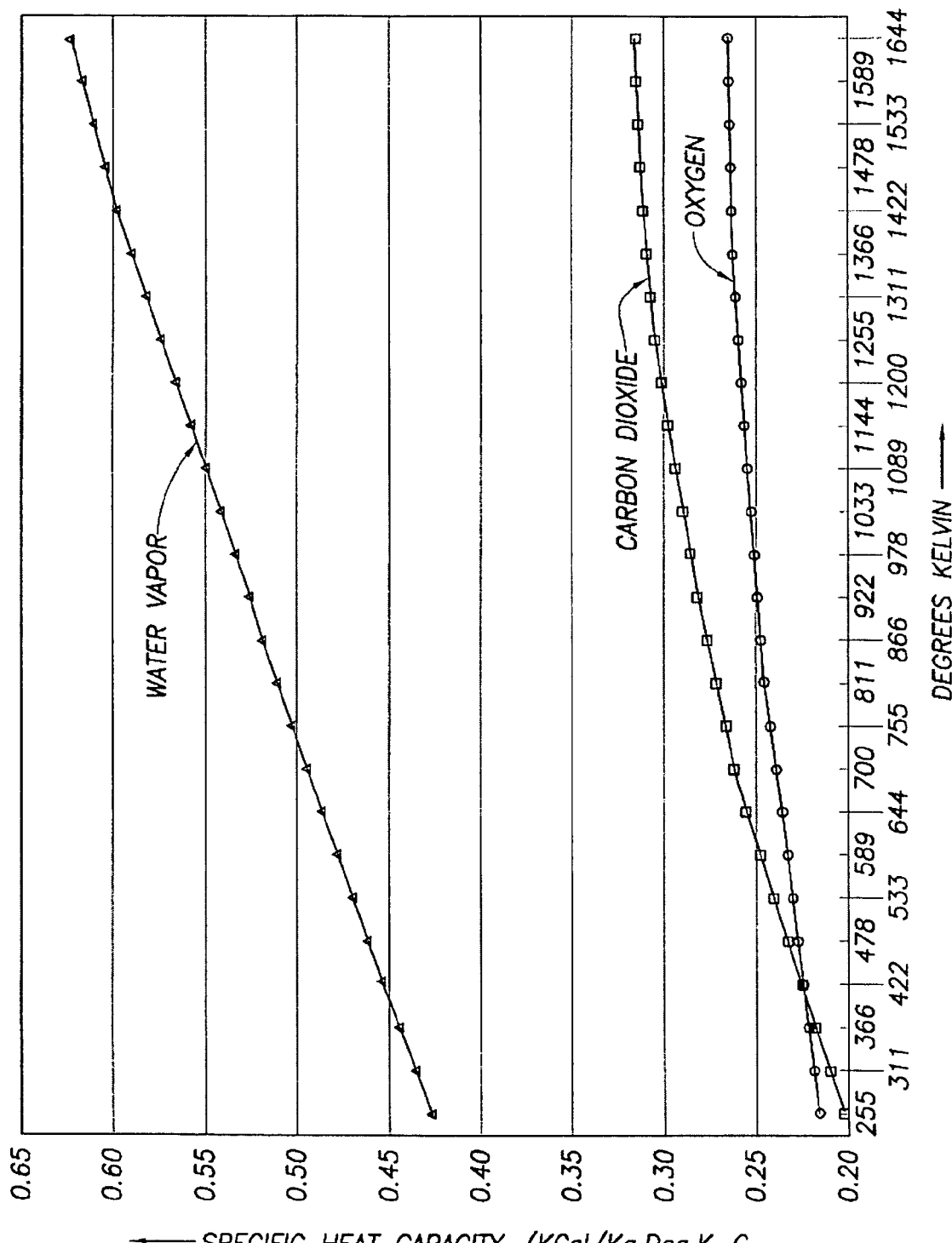
FIG. 4 is a graphical representation of the effect of temperature on the specific heat capacity of oxygen, carbon dioxide, and water.

FIG. 4 graphically depicts the relationship noted by these calculations.

The specific heat capacity of a mixture of gases can be approximated by scaling each individual gas constituent specific heat capacity to that constituent's mass percentage of the mixture and summing the values derived. A mixture composed of 52.88462% carbon dioxide, 43.26923% water vapor and 3.84615% oxygen will then have a resultant specific heat capacity as follows:

$$C_{P(MIXTURE)}=0.5288462C_{P(CO2)}+0.4326923C_{P(H2O)}+0.0384615C_{P(O2)}$$

These are the proportions calculated for the combustion gas produced from the complete combustion of methane with pure oxygen with a 5% surplus of oxygen being supplied. Knowing the amount of thermal energy released from the combustion reaction as sensible heat and the ambient temperature at which the combustion gas constituents entered the process one can calculate both the specific heat capacity of the resulting gas mixture and the theoretical maximum combustion gas temperature. Considering that both the resulting gas temperature and the specific heat capacity of the gas mixture are interdependent variables, a re-iterative process may be applied to calculate these parameters.

To avoid the high combustion gas temperatures noted by Wagner while allowing the combustion process of the present invention to be used in a practical manner with standard combustion chamber construction and standard energy recovery boiler equipment combinations of combustion gas recirculation and water injection are utilized. Calculations have been carried out to determine the appropriate quantities of combustion gas recirculation and water injection required to achieve 2,500 degrees Fahrenheit in the combustion chamber of the present invention. The data charts and plots which follow detail the calculation results.

Figure 5:
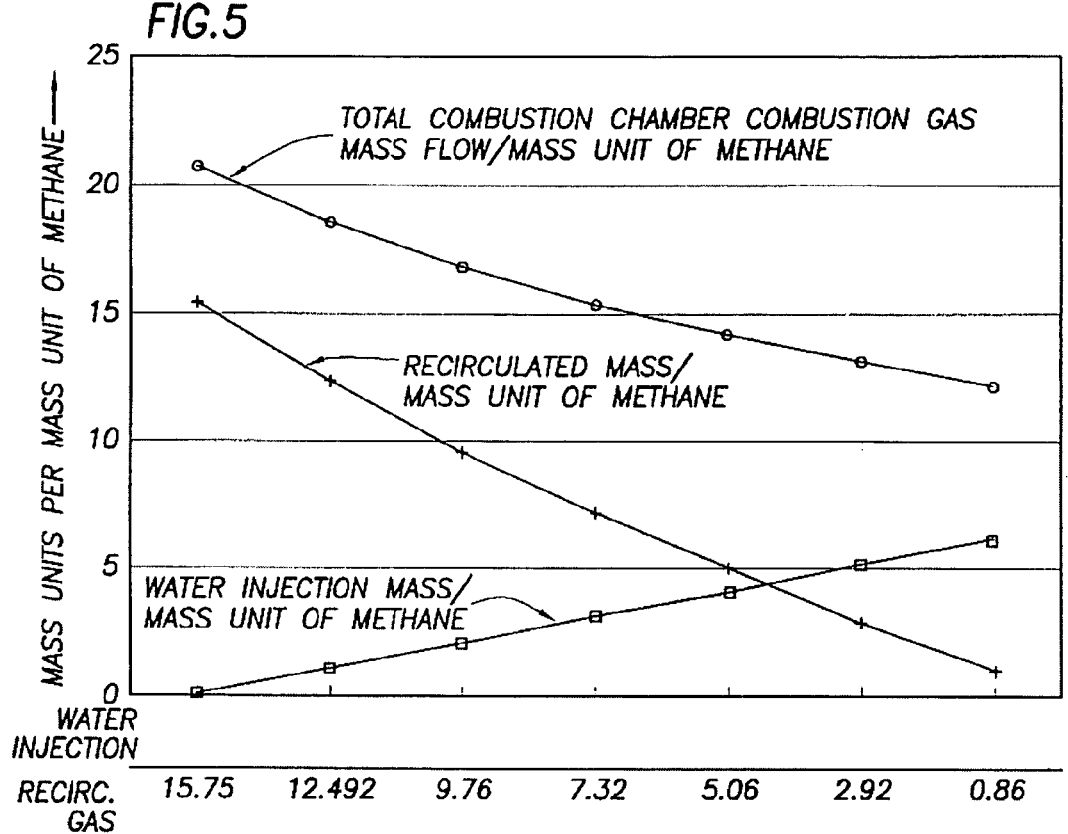
FIG. 5 is a graphical representation depicting the impact of water injection and recirculation upon an embodiment of the thermal process.

Table One below details the data derived from the calculations utilized to produce FIG. 5.

TABLE ONE

Relative Mass Flows For Methane-Oxygen Combustion
Water Injection & Recirculation To Maintain 2500 Deg. F.

|  | Extra H$_2$O Injection | Recirc. Mass | Total Mass |
|---|---|---|---|
| Case One | 6.426 | 0 | 11.626 |
| Case Two | 0 | 15.75 | 20.95 |
| Case Three | 1 | 12.492 | 18.692 |
| Case Four | 2 | 9.75 | 16.96 |
| Case Five | 3 | 7.32 | 15.52 |
| Case Six | 4 | 5.06 | 14.26 |
| Case Seven | 5 | 2.92 | 13.12 |
| Case Eight | 6 | 0.86 | 12.06 |

Note from the calculations and plotted data derived therefrom that control can be exercised over the quantity of combustion gas generated per unit of fuel mass combusted while maintaining a moderate combustion gas temperature. Utilizing a combination of water injection and recirculation of cooled combustion gas the total mass flow of combustion gas out of the combustion chambers can vary from 20.95 to 11.626 mass units per mass unit of methane fuel combusted with 1.05 times stoichiometric oxygen while maintaining 2,500 degrees Fahrenheit combustion gas temperature. These calculations assume a 10% loss of thermal energy through the combustion chamber walls. The lowest combustion gas mass flow is achieved with zero combustion gas recirculation and water injection alone utilized to moderate combustion gas temperature. The latent heat of vaporization of water is utilized to advantage in this case as a means of minimizing mass flow per unit of fuel mass being combusted. Under circumstances where this type of operation is favored the present invention can be so operated. Otherwise some combination of water injection and cooled combustion gas recirculation will normally be utilized as the means to control combustion gas temperature in the combustion chambers.

Figure 6:
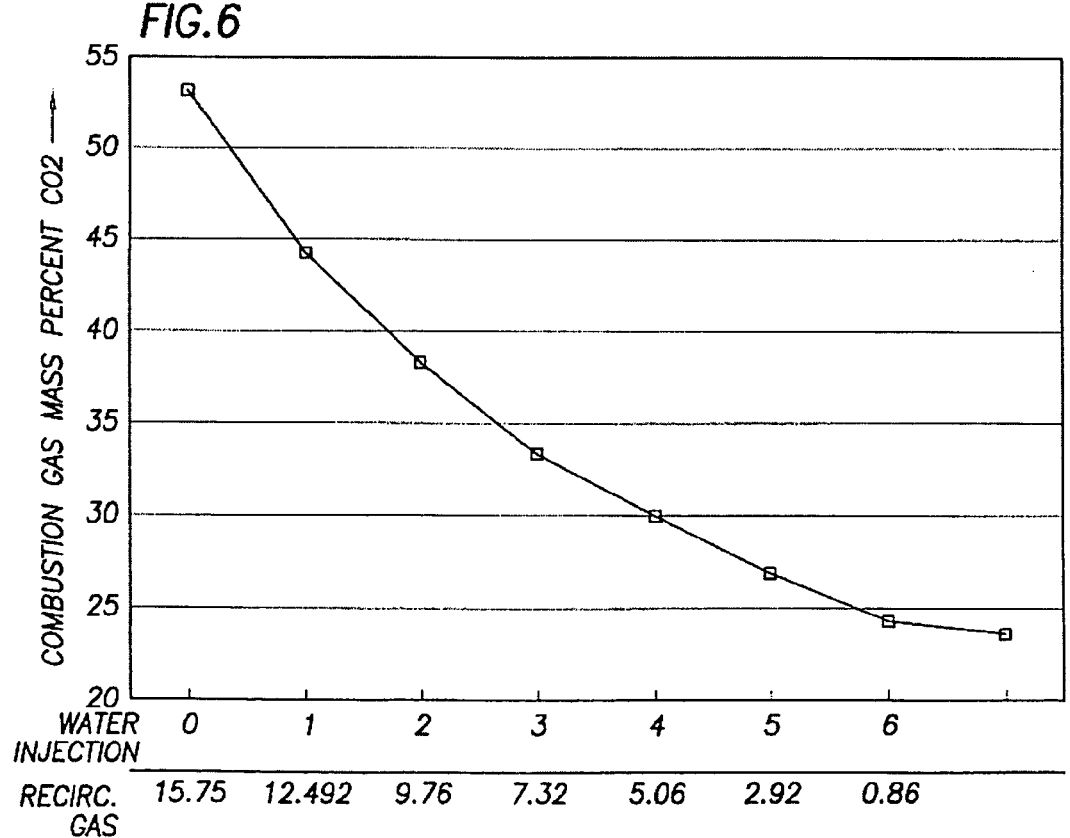
FIG. 6 is a graphical representation of the impact of water injection and recirculation gas on the percentage of carbon dioxide produced during combustion.

As shown in FIG. 6, the highest level of carbon dioxide in the combustion gas occurs with zero water injection and recirculation of combustion gas alone being utilized to moderate combustion gas temperature. In this case the level of carbon dioxide will reach 52.88% of the total combustion gas production rate. The lowest level of carbon dioxide in the combustion gas occurs with zero recirculation and water injection alone moderating the combustion gas temperature. In this case the level of carbon dioxide will drop to 23.65% of the combustion gas mass out of the combustion chamber.

Energy absorbed as latent heat of vaporization into water is not recovered in the energy boiler of the present invention. This is a disadvantage of water injection to moderate combustion gas temperature. An advantage of water injection in addition to the reduced combustion gas volume is the fact that a portion of the water can readily be condensed by cooling the combustion gases with a groundwater indirect heat exchanger prior to the inlet of the of the carbon dioxide recovery system. By condensing a portion of the water vapor carried as a constituent of the combustion gas the gas volume is reduced and a cleansing effect is achieved for the combustion gas. As water droplets form during condensation, particulate matter and acidic constituents that might be carried in the gas due to less than ideal fuel composition are efficiently removed from the gas with the condensate. With a higher percentage of water and increased condensation, higher efficiency gas cleaning is achieved. When utilizing fuels that contain acid producing constituents and constituents that result in particulate matter formation water injection enhances the combustion gas cleansing process between the energy recovery boiler and carbon dioxide recovery system of the present invention and is included in the preferred embodiment for that reason. Additionally, the present invention includes a provision for an optional electron beam oxidation reactor to enhance the overall combustion efficiency of the process. Water molecules produce OH radials and atomic oxygen when bombarded by accelerated electrons. These highly reactive molecules act as scavengers for dilute concentrations of residual and reformed organic compounds in the post combustion chamber combustion gas stream. Included in the organic compounds that might be present in the post combustion chamber combustion gas stream are dioxins and furans. Destroying these compounds to avoid contamination of the process effluents from the present invention is high priority consideration.

Figure 7A:
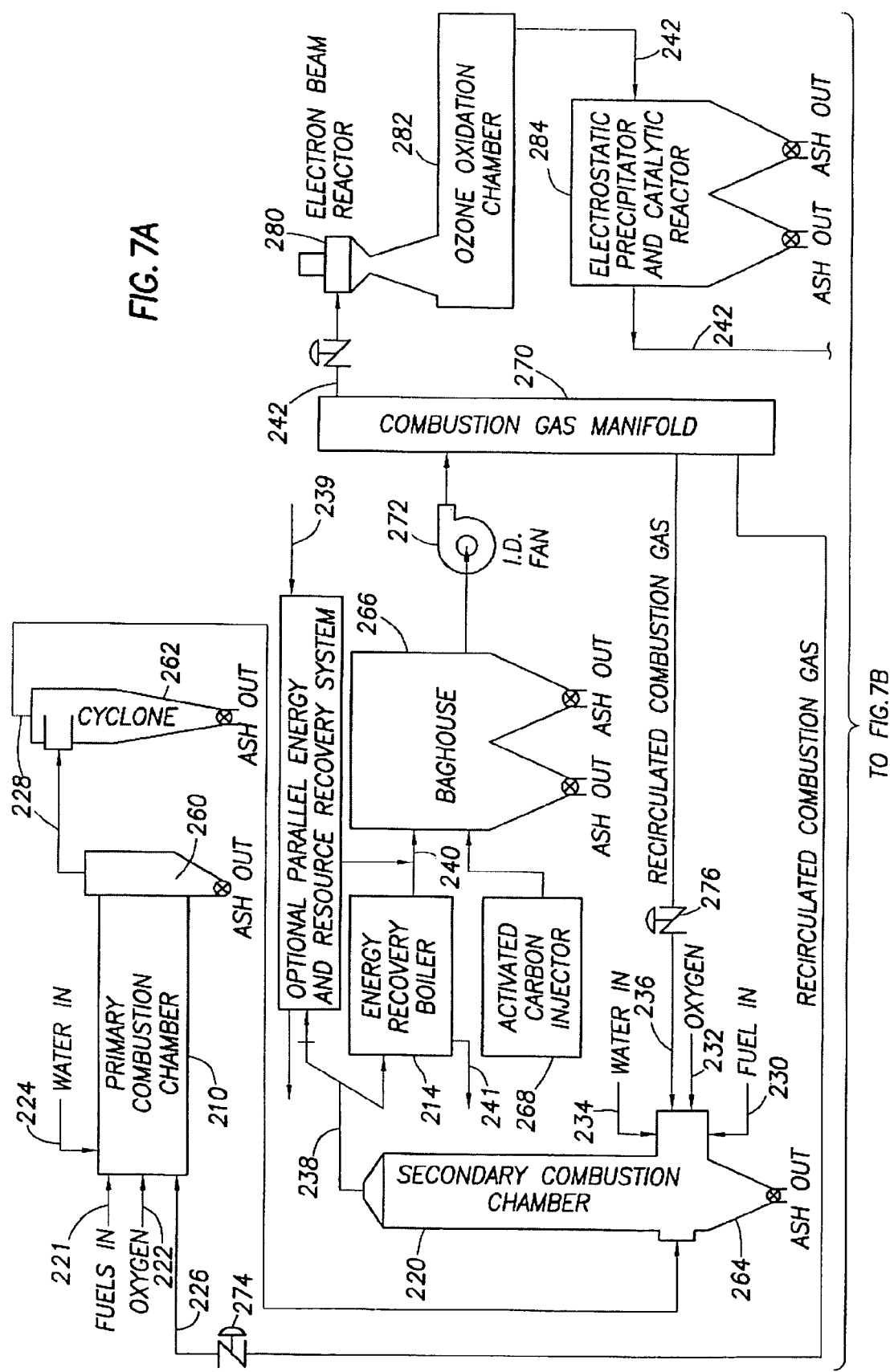
FIGS. 7A and 7B depict a process flow diagram of an embodiment of the thermal process.
Figure 7B:
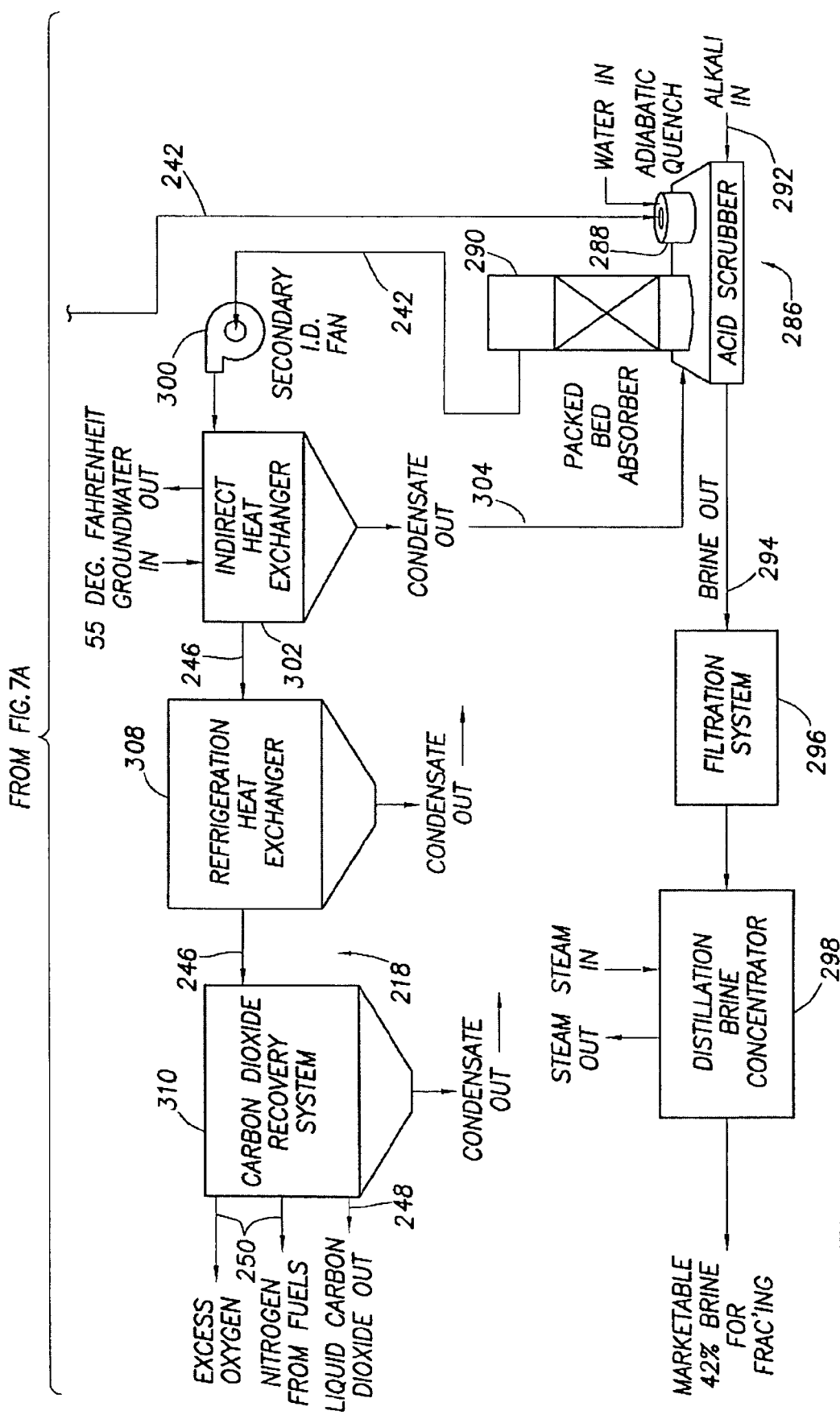

As shown in FIGS. 7A and 7B, this embodiment of the process of the present invention begins by introducing a fuel stream 221, oxygen stream 222, and a water stream 224 into primary combustion chamber 210 wherein the hydrocarbons from the fuel are combusted to produce the combustion product of carbon dioxide, water, and other combustion gases. Primary combustion chamber 210 has an ash separation section 260 for removing a portion of solid components including ash that result from the combustion process. Combustion product 228 is then introduced into a separation cyclone 262 to remove additional ash and solids. Separation cyclone 262 is of a variety commonly known to those skilled in the art of combustion process. Having had the ash and decontaminated soil removed, combustion product stream 228 is then introduced into secondary combustion chamber 220.

Preferably, secondary combustion chamber 220 is a vertical combustion chamber such as is known by those of ordinary skill in the art. Hydrocarbons from combustion product stream 228 are reacted with an additional fuel stream 230, a second substantially pure oxygen stream 232, and a second water stream 234 in secondary combustion chamber 220. Fuel streams 221 and 230 can be a variety of fuels or combinations of fuels, including methane and other hydrocarbon-containing compounds, including hydrocarbon contaminated soils. Solids, ash and other particulate matter are removed from a bottom cone section 264 of secondary combustion chamber 220. Reaction product stream 238 exits from the top of secondary combustion chamber 220. Secondary combustion chamber 220 is included in the process of the present invention to produce high combustion efficiency.

One feature of the process of this embodiment is the ability to recover the energy, in the form of heat, from reaction product stream 238. Preferably, an energy recovery boiler 214 is used to recover the heat energy from reaction product stream 238. As those skilled in the art would recognize, energy recovery boiler 214 is used to generate steam by transferring the heat energy from reaction product 238 to a water stream. A portion of stream 238 can be used in parallel with energy recovery boiler 214 to heat other process streams through cross exchanges of energy. Alternatively, other forms of heat exchangers can be used to recover the heat energy from reaction product stream 238 in place of energy recover boiler 214. Removal of the heat energy from stream 238 in recovery boiler 214 results in a cooler stream temperature. Preferably, stream 238 is cooled to about 450 degrees Fahrenheit.

Cooled reaction product stream 240 is then introduced into a bag house 266 for removal of particulate matter from cooled reaction product stream 240. Bag house 266 is of a design commonly known and used by those skilled in the art. Preferably, an activated carbon injector 268 can be utilized along with bag house 266 to assist in removal of particulate matter.

Upon exiting bag house 266, cooled reaction product stream 240 is introduced into combustion gas manifold 270. Fan 272 can be used to increase the pressure of cooled reaction product stream 240 prior to introduction into gas manifold 270.

In gas manifold 270, cooled reaction product stream 240 is split into three streams. First stream 226 is recirculated to primary combustion chamber 210 to increase combustion efficiency. The amount of recirculating combustion gas introduced into primary combustion chamber 210 can be controlled by control valve 274 or other means of regulating stream volume. A second portion of gas is removed from combustion gas manifold 270 and recirculated as gas stream 236 into secondary combustion chamber 220. The volume of gas flow from stream 236 is controlled by a control valve 276 or other means of regulating flow. Recirculation of gas stream 236 is introduced to secondary combustion chamber 220 to increase the efficiency of secondary combustion chamber 220.

The remaining portion of reaction product stream 240 exits combustion gas manifold 270 as stream 242. Stream 242 is essentially the product stream from the combustion portion of the process of the present invention. Stream 242 comprises carbon dioxide, water, along with various other impurities and unreacted components from the combustion process. Stream 242 is introduced into electron beam reactor 280 to break down residual dilute organic compounds contained within stream 242 and to impart an electrical charge on any residual particulate matter in stream 242. Electron beam reactor 280 is of a variety commonly known and available to those skilled in the art. Stream 242 exits electron beam reactor 280 directly into ozone oxidation chamber 282 where additional components are oxidized and aid removal of them from the gas stream.

Next, stream 242 is introduced into an electrostatic precipitator and catalytic reactor 284. In precipitator 284, additional particulate matter is removed from stream 242 including the particulate matter electrically charged by electron beam reactor 280.

Stream 242 is next introduced into acid scrubber system 286 to remove any remaining acidic constituents in the gas stream. Acid scrubber system 286 comprises an adiabatic quench 288 and pack bed absorber 290. Acid scrubber system 286 is of a design commonly known to those skilled in the art of purifying gas streams. An alkaline stream 292 is contacted through countercurrent flow to pack bed absorber 290 to react away acidic components found in stream 242. Optionally, acid scrubber system 286 may consist of a series of pack bed absorbers 290 to increase contact efficiency. The brine stream 294, which results from a contact of the alkaline stream 292 with the acid gas components, can then be filtered in filtration system 296. Stream 294 is then concentrated in distillation brine concentrator 298 to produce, for example, a marketable 42% brine stream for use in downhole hydrocarbon production, particularly fracturing operations.

Upon exiting acid scrubber system 286, stream 242 is increased in pressure by fan 300 and introduced into indirect heat exchanger 302. Indirect heat exchanger 302 is of a variety commonly known to those skilled in the art of heat transfer. Preferably, ground water at approximately 55° F. is used to condense the water vapor from stream 242. The condensation of water vapor also removes most of any remaining forms of contamination in the gas stream. Additionally, a condensate stream 304 comprising the water and any residual contaminants is returned to acid scrubber system 286 where it is combined with the brine.

Carbon dioxide stream 246 is then introduced into recovery system 218. Initially, stream 246 is introduced to a refrigeration heat exchanger 308. Stream 246 then enters carbon dioxide recovery system 310 where liquid carbon dioxide is separated from any excess oxygen or nitrogen remaining in stream 246. Carbon dioxide recovery system 310 is of a design commonly known to those of ordinary skill in the art. As can be seen, liquid carbon dioxide stream 248 can then be marketed as a product to those needing carbon dioxide streams.

Finally, gas discharge stream 250 comprising excess oxygen and any nitrogen originally introduced through fuel streams 220 and 230 can be discharged to the atmosphere. When operated under conditions such as described herein, gas discharge stream 250 is eliminated or substantially reduced in comparison to prior art combustion processes.

Figure 8A:
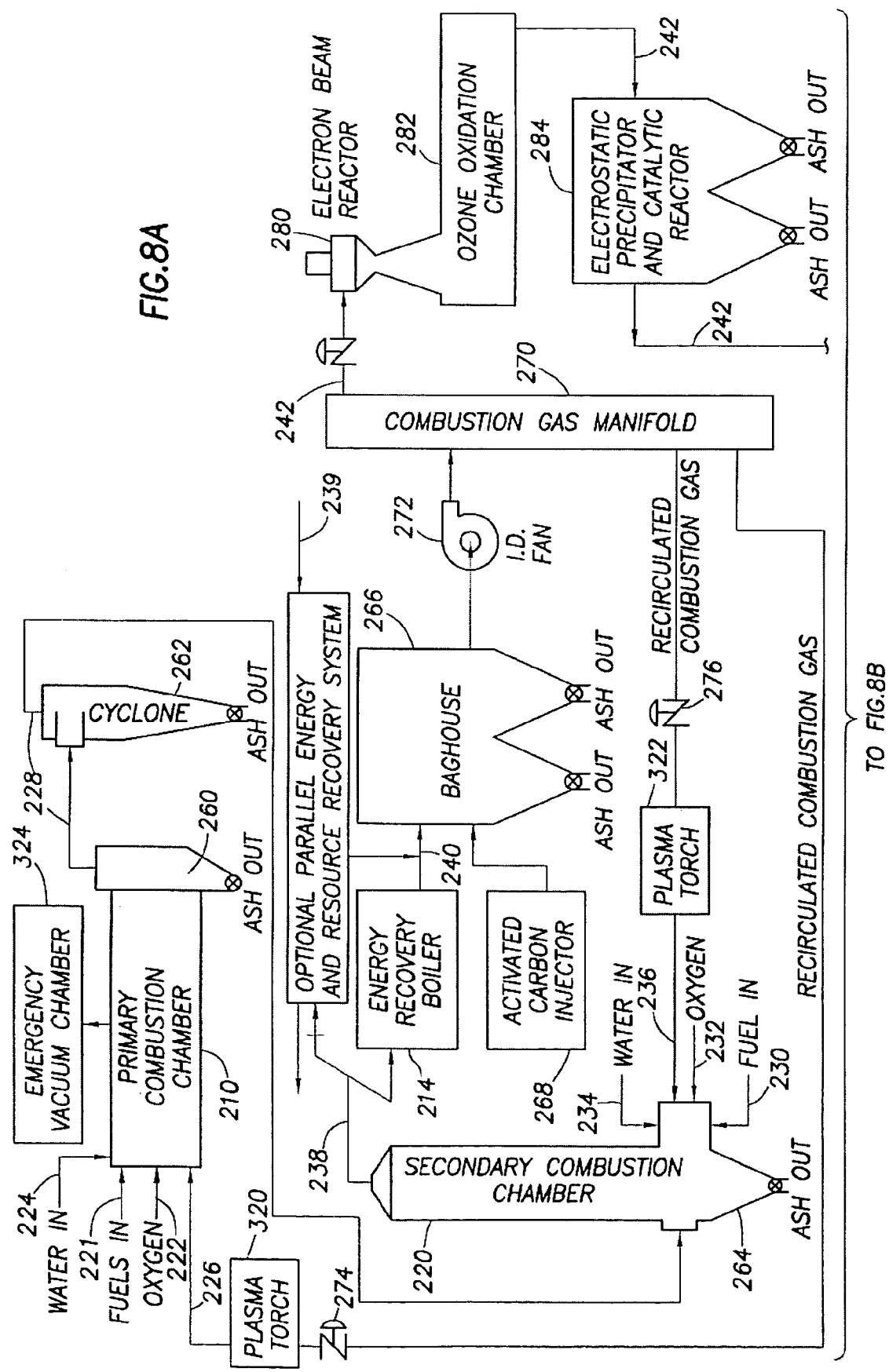
FIGS. 8A and 8B depict a process flow diagram of the embodiment of the thermal process shown in FIGS. 7A and 7B with additional optional features.
Figure 8B:
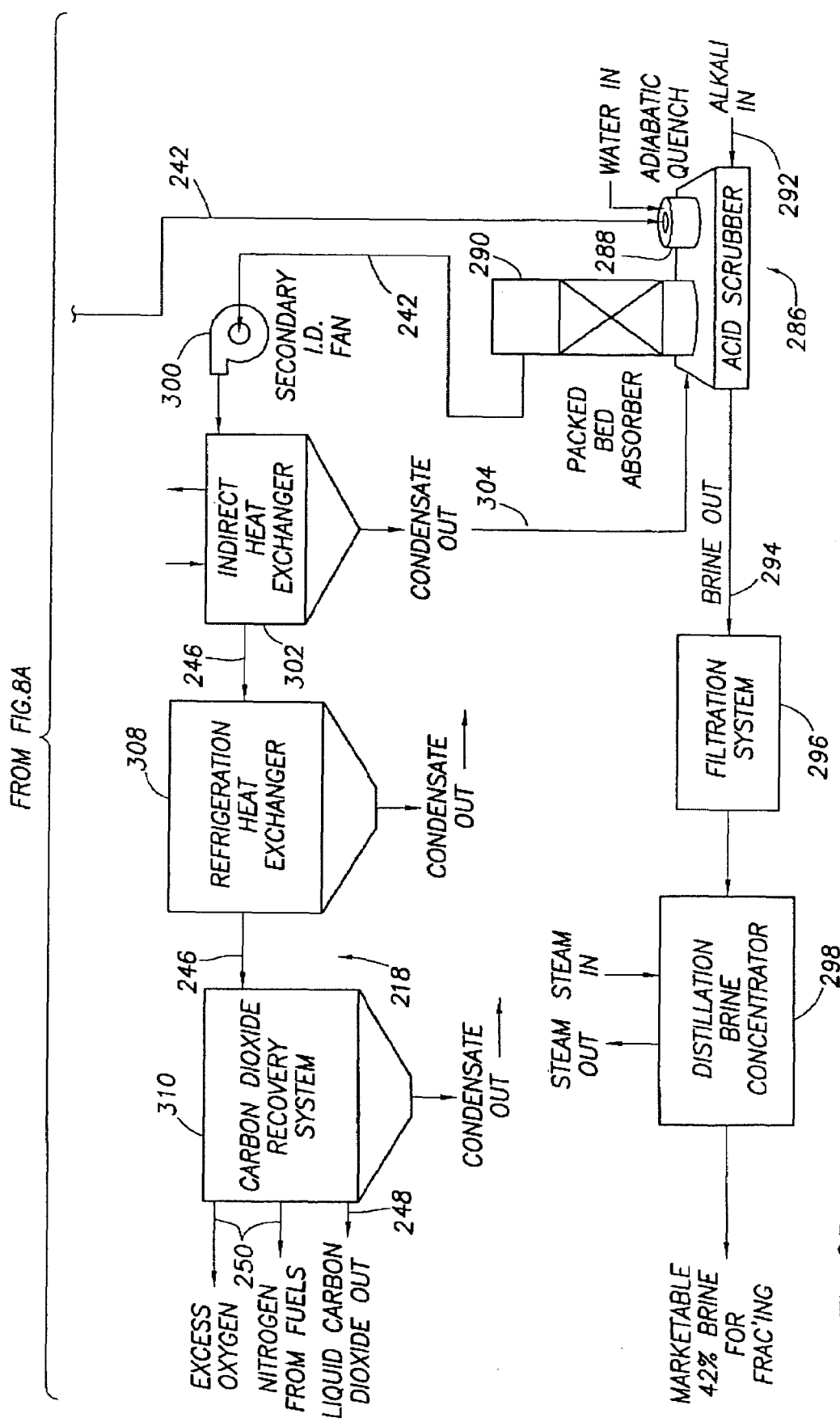

FIGS. 8A and 8B disclose an adaptation of the embodiment of the present invention disclosed in FIGS. 7A and 7B. Particularly, the process of FIGS. 8A and 8B have been adapted to include plasma torches 320 and 322 and emergency evacuation chamber 324. Plasma torches 320 and 322 are of a variety commonly known to those skilled in the art. Emergency evacuation chamber 324 is an additional safety feature to enhance the safety associated with the process of the present invention.

By utilizing pure oxygen for combustion and employing water injection and recirculated combustion gas to moderate combustion gas temperature in the combustion chambers the present invention allows all products of combustion to be captured before emission into the environment. The captured products of combustion include carbon dioxide, water, and excess oxygen. When nitrogen is present in the fuels being combusted a mix of oxygen with a fractional trace of nitrogen will be removed together. Provision is made in the present invention to maintain the highest possible combustion efficiency to reduce the level of trace organic compounds in the combustion gas. Provision is also made to remove with the highest efficiency possible any acidic and particulate constituents produced by the combustion of less than ideal fuels in the combustion chambers of the present invention allowing the recovery carbon dioxide and residual oxygen.

Solvent Process

Referring back to FIG. 2, the solvent process 20 of the present invention utilizes the purified carbon dioxide stream 72 from the thermal process 10 as a super-solvent to remove hydrocarbon and chlorinated hydrocarbon contamination from moderately contaminated soils 74. Use of the solvent process 20 allows treatment of moderately contaminated soil 74 without actual thermal treatment of the soil and without emissions. Contaminated soil 74 is introduced into a soil processor or separator where it is contacted with the carbon dioxide stream 72. Depending upon the level of hydrocarbon contamination, a carbon dioxide recycle stream 78 can be utilized to minimize the amount of carbon dioxide required for solvent process 20. The carbon dioxide is then removed from the soil and decontaminated soil stream 76 can be removed from the system and returned to the original site as clean soil or used as refill in other areas. The carbon dioxide containing the contaminates can be sent to thermal process 10 for further treatment. Optionally, the carbon dioxide and contaminants can be separated in the solvent process 20 and a contaminant stream 80 returned to the thermal process 10 while a recovered carbon dioxide stream 82 can be used in other processes.

Figure 9:
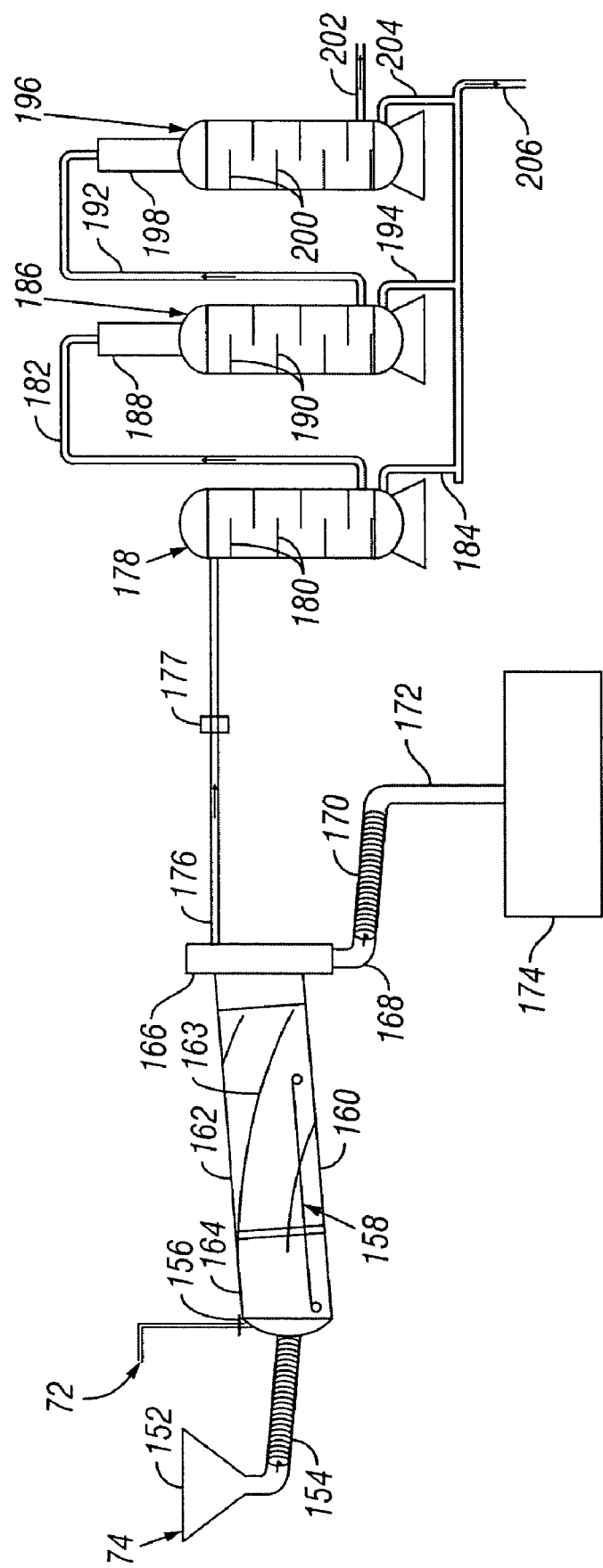
FIG. 9 is a process flow diagram of an embodiment of the solvent process.

Referring to FIG. 9, contaminated soil stream 74 is introduced into the solvent process 20 through inlet 152. Soil stream 74 can be any type of soil or waste material contaminated with hydrocarbons. Generally, soil stream 74 has hydrocarbon contamination of less than 1% by volume. Typically, soil stream 74 has between about 20,000 and about 50,000 mg/kg of total petroleum hydrocarbons (or "TPH") as determined by Environmental Protection Agency, "EPA", standard method 418.1.

Inlet 152 can be a funnel-shaped bin or other structure such as an inverted pyramid that directs soil towards a soil conveyor such as auger 154. Auger 154 is preferably a screw auger such as is known to those skilled in the art. Auger 154 pushes hydrocarbon contaminated soil stream 74 forward and into soil processor vessel 160. Preferably, auger 154 is a 24 inch auger capable of moving at least 60 cubic yards of soil per hour. Auger 154 allows introduction of the soil stream while maintaining a seal on vessel 160.

Soil processor vessel 160 is preferably designed to withstand 120 psig and a full vacuum. Soil processor vessel 160 is preferably constructed of steel, most preferably rolled A36 steel.

Soil processor vessel 160 preferably has three sections: a fixed end 164; a rotating section 162; and a separation chamber 166. Preferably, soil processor vessel 160 is cylindrically shaped with a diameter of at least three to four feet. Rotating section 162 of vessel 160 has internal baffles or paddles 163 configured in a helical or spiral-type configuration to assist moving soil forward through vessel 160. Preferably, baffles 163 have apertures. Soil processor vessel 160 is preferably angled relative to the horizontal. More preferably soil processor vessel is angled at between about 5 and about 25° relative to the horizontal with the separation chamber 166 being higher than fixed end 164. Rotating section 162 operates similarly to a cement mixer rotating completely during the soil washing process.

Internal to soil processor vessel 160 is soil shaker 158. Soil shaker 158 is of a variety commonly used on drillings rigs for screening drilling muds. Soil shaker 158 has a screen which is vibrated. As will be recognized by those of skill in the art, the screen size on shaker 158 can be varied in size depending upon soil makeup. Soil shaker 158 preferably has a cylindrical screen having approximately six inches to one foot diameter smaller than a diameter of vessel 160. Preferably, soil shaker 158 rotates with rotating section 162 of vessel 160.

Auger 154 drops the soil upon soil shaker 158 inside soil processor vessel 160. Shaker 158 vibrates advancing the soil sifting a portion of the soil through the screen onto the inside of vessel 160. Shaker 158 shakes the soil through the screen decreasing the particle size. This screening process maximizes the amount of contact between the contaminated soil and the carbon dioxide.

Carbon dioxide stream 72 is introduced through vessel inlet 156 on vessel 160. Preferably vessel inlet 156 is simple nozzle located the top of fixed end 164 of vessel 160. Carbon dioxide stream 72 is a liquid stream, preferably taken from the carbon dioxide recovered in thermal process 10. Preferably, carbon dioxide stream 72 is pumped into vessel 160.

Rotating section 162 of vessel 160 rotates causing agitation and increasing the contact between the carbon dioxide and soil. Further, the rotation returns soil to the shaker 158 where it is again sifted and further exposed with carbon dioxide. Baffles 163 and the rotation of section 162 allow multiple passes of the soil through contact with the carbon dioxide.

Preferably, vessel 160 is maintained between about 10% and 50% full of liquid carbon dioxide. More preferably, vessel 160 is approximately 25% liquid full. A pressure controller 177 downstream of second end 166 of vessel 160 maintains the pressure on the vessel to prevent the entire carbon dioxide stream from flashing immediately upon entry to vessel 160. Pressure controller 177 can be a restricting orifice, valve, automated valve, pressure regulator, or other pressure or gas flow controlling devices.

As the soil advances further up the shaker 158, out of the liquid carbon, carbon dioxide evaporates off of each particle assisted by the sifting action.

Shaker 158 ultimately drops the contaminated soil through soil outlet 168 where it is removed by a second soil conveyor such as auger 170 where it can be returned to a clean soil bin 174 or other holding areas. Preferably auger 154 and 170 are of substantially equivalent design.

In experimental data using an embodiment of the present invention, contaminated soil was measured using EPA method 418.1 to determine the total petroleum hydrocarbons. Samples having from between about 46,000 and about 180,000 milligrams per kilogram prior to introduction into the processor vessel 160 were reduce to non-detectable levels using an embodiment of the present invention as analyzed by EPA method 8020A (measuring micrograms per kilogram).

Carbon dioxide and extracted hydrocarbon contaminates exit vessel 160 through line 176. The hydrocarbons, other contaminates, and entrained solids are removed from the carbon dioxide stream through a series of vessels 178, 186, and 196. Separator vessel 178 has baffles 180 to promote separation. Preferably, line 176 enters separator vessel 178 tangential to create a centrifuge effect. Entrained solids fall to the bottom of vessel 178 while condensed liquids exit separator vessel 178 through outlet 184.

The remaining carbon dioxide and hydrocarbon stream is sent through line 182 to vessel 186. Separator vessel 186 has a flash section 188 having a traditional "shotgun barrel" design which causes any entrained liquid carbon dioxide to vaporize as well as assist separation of heavier hydrocarbon contaminants. Similarly to vessel 178, separator vessel 186 has internal baffles 190 to assist in the separation process. Any entrained solids will collect in the bottom of vessel 186 while condensed liquids are removed through line 194 and combined with liquids in line 184. Optionally, a second separator vessel 196, of generally the same construction as vessel 186 can be utilized if needed to remove additional hydrocarbons from the carbon dioxide. Condensed liquids from vessel 196 are removed through line 204 and combined with the liquids from lines 184 and 194. This combined stream 206 can be directed to thermal incineration process such as thermal process 10. Vaporized carbon dioxide exiting the system through line 202 can be compressed and returned to the carbon dioxide recovery system 310 as shown in FIG. 7A.

Experimental results indicate that approximately ten pounds of carbon dioxide will dissolve and remove one pound of hydrocarbon contamination. Therefore a cubic yard of soil at typical contamination conditions will require approximately 10,000 standard cubic feet of carbon dioxide for this process.

Figure 10:
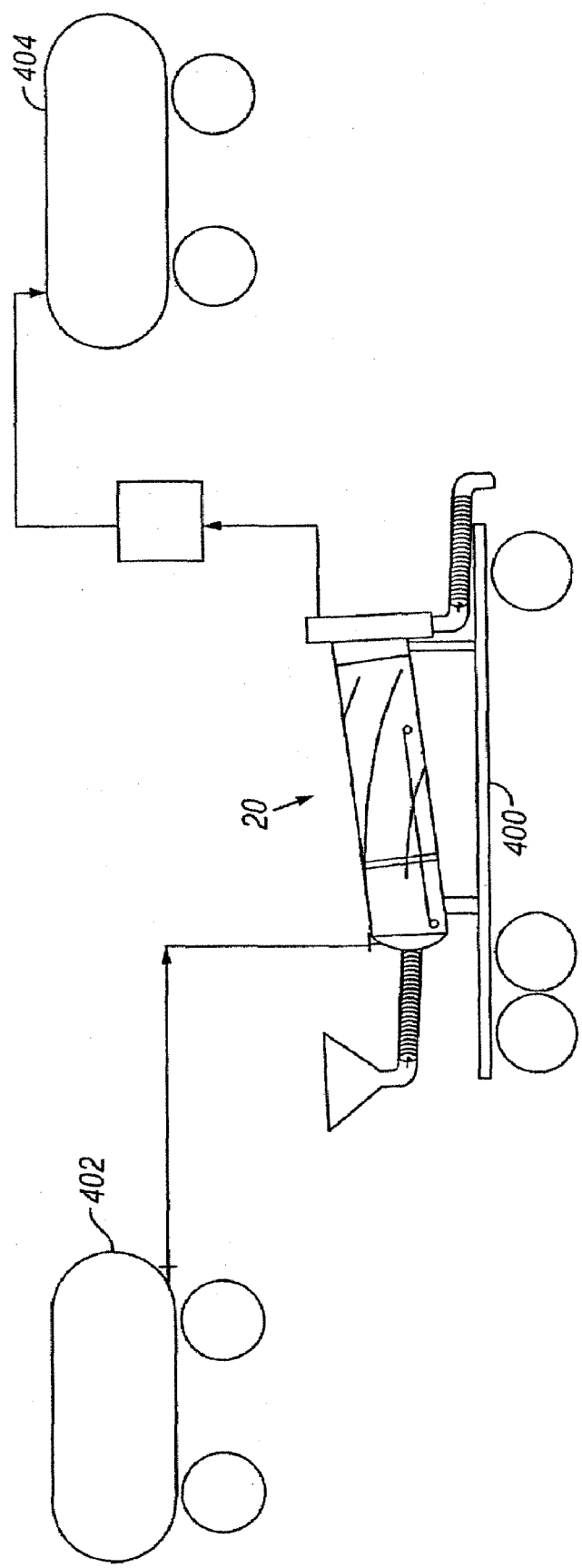
FIG. 10 is a process flow diagram of an alternative embodiment of the solvent process.

As shown in FIG. 10, the solvent process 20 of the present invention can be a mobile installation. In this embodiment the process components are mounted on a mobile platform 400 such as a portable skid, a trailer, or a truck bed. Liquid carbon dioxide can be supplied to the process by a tank truck 402. Carbon dioxide containing the extracted hydrocarbons can be placed in a second tank truck 404 to be delivered back to thermal process 10. This process is particularly useful for sites requiring only a few truckloads of soil to be decontaminated. This mobile embodiment can be delivered directly to a site containing contaminated soil. Contaminated soil can be picked up, treated in a solvent process 20, and returned without ever having to leave the contamination site. In this embodiment, separator vessels 178, 186, and 196 are optional.

Other Process Systems

Referring back to FIG. 2, a vaporization process 50 can be used in conjunction with thermal process 10 and solvent process 20. In this embodiment of vaporization process 20, lightly contaminated soil 92 is subjected to a vaporization process utilizing heat energy generated from thermal process 10 to heat the soil and vaporize low boiling point hydrocarbons such as gasoline. Steam 94 generated in thermal process 10 can be used to heat oil or other heat transfer agents in heat exchanger 98. Heat transfer agent stream 100 can then be used to heat soil stream 92 in the vaporization process 50. Alternatively, steam 94 can be used directly to provide heat for the vaporization process 50. In either case, condensate stream 96 can be returned to thermal process 10. Vaporization process 50 can utilize a heat screw system in a partial vacuum environment or other similar techniques such as are known to those skilled in the art for heating and mixing soils or materials of similar consistencies. Vapor stream 104 generated in the vaporization process 50 can be captured, condensed, and used as fuel for thermal process 10. Decontaminated soil stream 106 can be removed from the system and returned to the original site as clean soil or used as refill in other areas.

Any of the decontaminated soil streams 70, 76, or 106 that may contain residual metals can be further processed to remove the metal contamination. These streams can be washed with a dilute acid solution 118 in a soil acid rinsing process 108 to leach out the residual metals until an acceptable level of contamination is reached. The acid washed soil stream 110 exiting the rinsing process 108 can be mixed with a calcium hydroxide lime stream 114 in a mechanical blender 112 to neutralize residual acid. Decontaminated soil stream 116 can be removed from the system and returned to the original site as clean soil or used as refill in other areas.

Rinsate stream 120 can also be neutralized using a lime stream 124 in a neutralization process 122. Hydroxides of the metals rinsed from the soils and dissolved into the acid rinsate stream 120 are formed when the rinsate 120 is treated by the addition of calcium hydroxide lime stream 124. These metal hydroxides can be removed from the neutralized rinsate stream 126 utilizing both a Lamella clarifier 128 and a filter press 130. The spent filter cake stream 132 containing the metal hydroxides can then be mixed with the fly ash stream 134 from the thermal process 10 and/or a Portland cement stream 136 in a mixer and block molding process 138 for stabilization and disposal.

In Situ Decontamination

One alternative process in which either recovered carbon dioxide stream 84 from thermal process 10 or recovered carbon dioxide stream 82 from solvent process 20 can be used involves cleaning soil in place. This alternative process utilizes carbonic fluids injection and recovery well techniques to recover hydrocarbon contamination that has leached from the soil into the subsurface water supply. Carbon dioxide stream 88 is introduced into a carbon dioxide injection monitoring well 86 where the carbon dioxide is released into a subsurface formation. The carbon dioxide picks up hydrocarbons from the formations and accumulates in subsurface water. Multiple adjacent wells can be used to recover a water and carbon dioxide stream 90 containing the hydrocarbon contamination. Stream 90 is pumped to the surface and treated in the thermal process 10 where the hydrocarbons are converted into carbon dioxide and water with no emissions while all contamination is neutralized and turned into commercial byproducts. Stream 90 can be utilized in thermal process 10 as quench water stream 68 to moderate combustion chamber temperature.

As will now be recognized, the present invention includes a combination of processes to remove hydrocarbon and other contaminants from soil. Preferably, heavily contaminated soils will be treated in thermal process 10. Soils with medium contamination will be treated in solvent process 20 utilizing carbon dioxide generated in thermal process 10 as the solvent. Lightly contaminated soils can be treated in vaporization process 50 utilizing heat energy from thermal process 10 to vaporize contaminants. Additionally, excess carbon dioxide from the thermal process 10 can be injected into monitoring wells to clean hydrocarbons from contaminated subsurface formations and water.

The foregoing disclosure and description of the invention are illustrative and explanatory thereof, and various changes in the details of the illustrated apparatus and construction and method of operation may be made without departing from the spirit of the invention.

We claim:

1. A process for removing hydrocarbons from hydrocarbon contaminated materials, comprising the steps of:

providing a processing vessel;

introducing hydrocarbon contaminated materials into the processing vessel;

screening the hydrocarbon contaminated materials into finer particles within the processing vessel;

introducing liquid carbon dioxide into the processing vessel;

contacting the hydrocarbon contaminated materials with the liquid carbon dioxide;

extracting the hydrocarbons from the hydrocarbon contaminated materials using the liquid carbon dioxide as an extractant;

separating the carbon dioxide and the extracted hydrocarbons from the hydrocarbon contaminated materials to produce treated materials; and removing the treated materials from the processing vessel.

2. The process of claim 1, further comprising the step of separating the extracted hydrocarbons from the carbon dioxide used as an extractant.

3. The process of claim 1, further comprising the step of rinsing the treated materials removed from the processing vessel with an acid solution to remove residual metals.

4. The process of claim 1, wherein the processing vessel comprises a fixed section and a section that rotates.

5. The process of claim 1, wherein the hydrocarbon contaminated materials comprise hydrocarbon contaminated soil.

6. The process of claim 1, wherein the hydrocarbon contaminated materials comprise hydrocarbon contaminated waste.

7. The process of claim 1, wherein the introducing hydrocarbon contaminated materials step comprises conveying the hydrocarbon contaminated materials into the processing vessel.

8. The process of claim 1, wherein the hydrocarbon contaminated materials comprise less than about 1% by volume hydrocarbons.

9. The process of claim 1, wherein about ten pounds of the liquid carbon dioxide are introduced for every pound of hydrocarbon introduced in the hydrocarbon contaminated materials.

10. The process of claim 1, wherein the introducing the liquid carbon dioxide step comprises pumping the liquid carbon dioxide into the processing vessel.

11. The process of claim 4, further comprising the step of rotating the rotating section of the processing vessel to enhance contact of the liquid carbon dioxide with the hydrocarbon contaminated materials.

12. The process of claim 1, wherein the providing step comprises providing a mobile processing vessel.

13. The process of claim 1, wherein the screening step comprises screening the hydrocarbon contaminated materials using a soil shaker.

14. The process of claim 1, wherein the providing step comprises providing a processing vessel at an angle of about 5 degrees to about 25 degrees from the horizontal.

15. A process for removing hydrocarbons from hydrocarbon contaminated soil, comprising the steps of:

providing a soil processing vessel having a first fixed end, a section that rotates, and a second end;

introducing hydrocarbon contaminated soil into the soil processing vessel;

screening the hydrocarbon contaminated soil inside the soil processing vessel;

introducing liquid carbon dioxide into the soil processing vessel;

contacting the hydrocarbon contaminated soil with the liquid carbon dioxide; and extracting hydrocarbons from the hydrocarbon contaminated soil using the liquid carbon dioxide as an extractant;

separating the carbon dioxide and the extracted hydrocarbons from the hydrocarbon contaminated soil to produce treated soil; and removing the treated soil from the soil processing vessel.

16. The process of claim 15, further comprising the step of rotating the rotating section of the soil processing vessel to enhance contact of the liquid carbon dioxide with the hydrocarbon contaminated soil.

17. The process of claim 15, wherein the providing step comprises providing a mobile soil processing vessel.

18. The process of claim 15, wherein the providing step comprises providing a soil processing vessel at an angle of about 5 degrees to about 25 degrees from the horizontal.

19. The process of claim 15, further comprising the step of rinsing the treated soil removed from the soil processing vessel with an acid solution to remove residual metals.

20. The process of claim 15, further comprising the step of separating the extracted hydrocarbons from the carbon dioxide used as an extractant.

* * * * *